Patented Feb. 23, 1954

2,670,379

UNITED STATES PATENT OFFICE 2,670,379

MANUFACTURE OF UNSATURATED ALDEHYDES

David James Hadley, Epsom Downs, England, and Robert James Nichol, Belfast, Northern Ireland, assignors to The Distillers Company Limited, Edinburgh, Scotland, a British company No Drawing. Application March 16, 1950, Serial No. 150,108

Claims priority, application Great Britain March 25, 1949

19 Claims. (Cl. 260—604)

The present invention relates to an improvement in and a process for the manufacture of unsaturated aldehydes by the oxidation of olefines.

In copending application Serial No. 110,028, filed August 12, 1949 (now U. S. Patent No. 2,593,437), there have been described processes for the oxidation of propylene and isobutene respectively in the gaseous phase by means of molecular oxygen, which comprise passing gas mixtures containing these gases over a contact mass which contains initially copper and/or cuprous oxide and/or cupric oxide and/or copper compounds reducible to metal or oxide at temperatures between 180° C. and 400° C. and in the presence in the reaction zone of elementary selenium. The selenium can be introduced as vapour or produced in situ by the decomposition under reaction conditions of decomposable selenides. The copper or copper compounds may be distributed on carriers. As such carriers, activated silica gel and activated alumina have proved of particular value. When copper and/or the oxides of copper are distributed upon activated alumina and this solid mixture is subjected to a heat treatment at an elevated temperature, the copper combines with the alumina to form copper aluminate, as set forth in the further copending application No. 19,703/48. This copper aluminate acts in conjunction with elementary selenium as an efficient catalyst for the oxidation of these olefines and for the production of acrolein and methacrolein from propylene and isobutene respectively.

It has now been discovered that copper silicate in conjunction with elementary selenium acts as a very effective catalyst for the oxidation of olefines of the general formula:

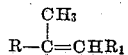

in which R and R₁ are hydrogen atoms or saturated straight or branched chain alkyl groups, and the production thereby of the corresponding unsaturated aldehydes:

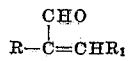

Accordingly the process for the manufacture of unsaturated aldehydes comprises reacting olefines of the general formula

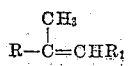

as defined in the gaseous phase with molecular oxygen at elevated temperatures in the presence in the reaction zone of elementaary selenium and of a solid contact material which comprises copper silicate.

Olefines of the described kind are, for instance, propylene, but-2-ene, isobutene, 2:4:4-trimethyl pent-1-ene, 2:4:4-trimethyl pent-2-ene, trimethylethylene, 2-methyl pent-1-ene, pent-2-ene, hex-2-ene, hept-2-ene, oct-2-ene, 2:5-dimethyl hex-2-ene, 3:5-dimethyl hex-2-ene, 2-methyl hept-1-ene, 2:3-dimethyl pent-1-ene, 2-methyl pent-2-ene, 2-methyl but-1-ene.

The copper silicate may be prepared in a known manner for instance, by the reaction of a water-soluble copper salt such as copper sulphate, copper nitrate and copper chloride with a water-soluble silicate such as sodium meta silicate. The copper silicate may be applied distributed on carriers such as asbestos, pumice, silica gel and alumina in order to obtain a large area of active surface. It is however, preferable to use the copper silicate in the absence of carriers in which case it is preferred to form the copper silicate into pellets. Preferably the silicate is subjected before it is used as solid contact material to a heat treatment at elevated temperatures such as 200° C. to 1,000° C.

The oxidation of the olefines is carried out by passing a mixture thereof with gases containing molecular oxygen over the copper silicate at temperatures between 200° C. and 400° C., preferably between 280° C. and 350° C. whilst provision is made for the presence in the reaction zone of elementary selenium.

The presence of elementary selenium in the reaction zone has the effect of increasing considerably the yield of unsaturated aldehydes, whilst at the same time excessive combustion and the formation thereby of oxides of carbon is materially restricted.

The elementary selenium acting in conjunction with the copper silicate as catalyst may be added to the mixture of gaseous reactants in the form of vapour or it may be generated in situ by the dissociation or decomposition of selenides, which may be added to the contact mass containing the copper silicate before the reaction is started. Suitable selenides are, for instance, the selenides of silver, antimony and cobalt. When the selenium is applied in the form of vapour admixed with the gaseous reactants, it is expedient to bring part or the whole of the olefine-oxygen mixture, or even part or the whole of the olefines only, into contact with heated selenium. By adjusting the temperature of the selenium reservoir and/or by regulating the amount of gas passed over the amount of selenium in the gas mixture may be regulated as desired.

The optimum concentration of selenium in the vapour phase depends to a certain extent on the kind of olefine to be oxidised but is not critical, for instance, 0.02 to 0.2 grm. in 100 litres of the gas mixture gives good results with 2% by volume of propylene in air. For the oxidation of isobutene in similar concentration in air 0.02 to 0.08 grm. of selenium per 100 litres of gas measured at room temperature is preferred. An increase in concentration above the upper limits mentioned does not apparently lead to any substantial improvement. Concentrations below the bottom limits still have a marked beneficial effect in suppressing the formation of carbon oxides and promoting the formation of unsaturated aldehydes.

The molecular oxygen used for carrying out the oxidation process may be in the form of pure oxygen, commercial oxygen or air. As the olefines form explosive mixtures with oxygen, it has been found convenient to use gas mixtures in which the percentage of olefine is less than that corresponding to the lower explosion limit in order to obviate or minimise the explosion hazards. A suitable mixture for effectively carrying out the process of the invention is for instance a mixture of 2 parts by volume of the propylene in 98 parts by volume of air. The lower explosion limits are for propylene 2.4% by volume in air and for isobutene 1.7% by volume in air. As alternatives to the nitrogen contained in the air, other inert gases or vapours may be added to the gaseous reactants. Such inert additions are, for instance, carbon dioxide and steam, which offer the advantage that they can easily be removed from the gaseous reaction products by scrubbing with alkali solutions or by condensation respectively.

For the mixtures of an olefine with oxygen and a diluent gas there is a limiting concentration of oxygen necessary for inflammability. Any mixture containing less oxygen is non-inflammable no matter what the ratio of propylene to diluent. In a recycle system fed with air and olefine the oxygen concentration can conveniently be brought below this level by adjustment of the recycle ratio and high concentrations of olefine can then safely be used.

The unsaturated aldehydes produced by the oxidation reaction may be recovered from the reaction mixture in any suitable way, for instance by scrubbing with a solvent or by cooling. The scrubbed gas mixture may then be allowed to go to waste, particularly when the percentage therein of unreacted olefine is small. It is, however, expedient to recycle the reaction gas mixture after the removal of the aldehyde, and after replenishment of the olefine and the molecular oxygen.

The recycling is particularly advantageous since part of the selenium and selenium compounds escaping condensation is thereby returned to the reactor. The recycling process also reduces the quantity of selenium which has to be removed from the gas mixture finally going to waste after the recovery therefrom of the unsaturated aldehyde. This is of importance since any selenium left in the gas going to waste creates a nuisance on account of its disagreeable smell and its toxicity.

The following examples illustrate the way in which the process may be carried out:

*Example 1*

100 grm. of $Cu(NO_3)_2.3H_2O$ was dissolved in 500 cc. cold water and 50 grm. commercial sodium metasilicate was dissolved in 600 cc. cold water. The second solution was slowly added to the first, which was vigorously stirred. The light blue precipitate produced was filtered off under suction and washed with some water. The filter cake was dried at 90° C. overnight and changed to a hard green mass. This was further heated at 300° C. for 12 hours. The product was crushed to pass an 18 mesh sieve and then compressed into pellets ⅛ inch diameter by ⅛ inch long.

8 grm. of the pellets was placed in a helical reactor of Pyrex (registered trade-mark) glass of 6 mm. bore which was heated in a liquid bath at 320° C. 25 litres per hour of a mixture of 2% v/v of propylene with air was passed over the surface of a pool of molten selenium and then through the catalyst. The selenium reservoir was of such a size and maintained at such a temperature that 0.02 grm. per hour of selenium was evaporated. The exit gases were scrubbed with water to remove the acrolein produced.

36% of the propylene was converted to acrolein and 3% to $CO_2$ and $H_2O$.

*Example 2*

8 grm. of the catalyst prepared as described in Example 1 but washed thoroughly with water before drying and heated after pelleting to 1,000° C. for 1½ hours, was used for the oxidation of isobutene. The method and apparatus were the same as in Example 1 except that isobutene was used instead of propylene.

33% of the isobutene was converted into alpha-methylacrolein and 13% to $CO_2$ and $H_2O$.

It has further been found that copper silicate when prepared in a special manner is of particularly good efficiency and possesses in addition other advantageous properties which will become evident in the subsequent description. This manner, which forms an additional feature of the present invention, comprises providing that the copper silicate after precipitation and before it is dried has been in contact with an acid aqueous medium which has a pH between 7 and 4.5.

Such a copper silicate may be obtained in various ways. It may be produced by reacting equimolecular amounts of a copper salt with an alkali metal metasilicate such as commercial sodium silicate in aqueous solution, and adding acid to the reaction mixture until the required pH value is obtained. Suitable copper salts are salts soluble in water such as copper nitrate, copper sulphate, copper acetate and copper chloride. The acid to be added may be the same as that forming the anion of the copper salt used, for instance nitric acid in the case of copper nitrate. On the other hand, the acid used may be different, for example the nitrate or chloride of copper may be used in conjunction with phosphoric acid. This latter method of preparation is particularly useful. A convenient way of carrying out the preparation of the copper silicate consists in adding the desired amount of acid to the solution of the copper salt before mixing with the metasilicate solution.

The acid may also be added after the precipitation of the copper silicate.

A further method of obtaining the copper silicate contact material according to the said additional feature of the present invention comprises precipitating the copper silicate in any desired way and washing the separated precipitate with an acid until the washings running from the precipitate show the desired pH value of between 7 and 4.5. In order to avoid unnecessary losses the washing is advantageously carried out with a dilute acid of the stipulated pH value.

It has been found advantageous to use both the solutions of the copper salt and of the alkali metal silicate for the precipitation of the metal silicate in not too great a concentration. It is preferred therefore to employ the copper salt solution in a concentration not considerably greater than 25% by weight and that of the silicate not considerably greater than 5% by weight.

The copper silicate after it has been in contact with the aqueous medium of a pH value of between 7 and 4.5 is not washed free from the acid before it is dried.

It has been found that when using the specially prepared copper silicate as solid contact material the proportion of carbon dioxide formed by the total combustion of the olefine relative to that of the desired unsaturated aldehyde decreases with the decrease of the pH value within the stipulated limits. On the other hand, the amount of copper silicate produced becomes less with the lowering of the pH in the aqueous medium, since it tends to dissolve in the acid solution. The dried copper silicate is normally heated in air to about 300° C. before it is pelleted. This treatment is particularly necessary when copper nitrate has been used in the preparation in order to avoid corrosion of the pelleting machine by residual nitrate. The copper silicate can easily be pelleted without the addition of binding agents or lubricants.

After pelleting a heat treatment similar to that described for copper silicate prepared in the ordinary way may be applied with advantage. Temperatures of between 400 and 1,000° C. gave beneficial results. The resulting pellets can be used with advantage for large scale operations without causing too great a resistance in the reactor when the reacting gases are passed through.

The following Table No. 1 shows the results obtained by carrying out the oxidation of isobutene over copper silicate catalysts prepared by the different methods. The first was prepared by the reaction of equimolecular proportions of copper nitrate and sodium metasilicate in an aqueous medium which finally showed a pH value of 8.5. Each of the others was prepared by adding 50 grm. of $Cu(NO_3)_2.3H_2O$ in aqueous solution to an aqueous solution 50 grams of sodium meta silicate containing 19.0% by weight of sodium, i. e. equimolecular proportions) after nitric acid in the indicated quantities had been added to the former so that the aqueous medium showed after precipitation a pH between 7 and 4.5. The oxidation was effected by passing at the rate of 25 litres per hour over 8 grm. of solid contact material thus prepared a mixture of 2% by volume of isobutene in air, to which mixture had been added per hour 0.02 grm. of selenium in vapour form. The temperature in the reaction zone was uniformly maintained at 320° C.

TABLE 1

| Experiment | Amount of normal nitric acid added, cc. | pH | Percent isobutene fed converted into methacrolein | $CO_2$ |
|---|---|---|---|---|
| 1 | | 8.5 | 13 | 3 |
| 2 | 50 | 6.1 | 48 | 35 |
| 3 | 365 | 4.6 | 33 | 8 |

The following examples illustrate the process of the invention when it is carried out with a copper silicate which during its preparation has been in ultimate contact with an aqueous medium between 7 and 4.5, before it is dried.

*Example 3*

50 grm. of crystallised copper nitrate was dissolved in a mixture of 200 cc. of water and 365 cc. of normal nitric acid, and this solution was stirred into a solution of 50 gm. of sodium metasilicate in 1,000 cc. of water. The pH of the aqueous medium after precipitation was 4.6. The precipitate was separated from the liquid by filtration and dried at about 100° C. It was then heated in a stream of air at 300° C. for one hour. The product thus obtained which weighed 10 grm. was then ground and pelleted and the pellets were heated to 600° C. for 1½ hours. The pellets thus obtained were placed in a reactor as described in Example 1 and heated therein to 320° C. 25 litres per hour of 2% isobutene in air together with 0.02 grm. selenium per hour were passed through the reactor over the catalyst. 33% of the isobutene fed was converted into methacrolein and 8% into carbon dioxide.

*Example 4*

A copper silicate catalyst was prepared by dissolving 500 grm. of crystallised copper nitrate in a mixture of 2000 cc. of water and 3,000 cc. of normal nitric acid. This solution was stirred into a solution of 500 grm. of sodium metasilicate in 10,000 cc. of water. The pH of the aqueous medium after the precipitation was 5.8. The precipitate was separated from the liquid by filtration and dried at about 100° C. without having been washed. It was then heated at about 300° C. in a stream of air. After grinding the product obtained was pelleted to pellets with ⅜ inch diameter and the pellets heated at 600° C. for 1½ hours.

170 grm. of the copper silicate pellets was placed in a vertical stainless steel tube of an internal diameter of ¾ inch. This tube was heated by a stirred molten salt bath which was maintained at 320° C. A gas stream of 400 litres/hour was charged with 30 grm. per hour of mixed trimethylpentenes (commercial di-isobutene) and to this gas mixture was added approximately 0.39 grm. of selenium vapour per hour before entering the reactor. The exit gas was passed through a trap kept at room temperature in which most of the selenium and some of the reaction products were condensed and after this 80 litres per hour of gas was vented through a trap cooled by a solution of solid carbon dioxide in alcohol.

The remainder of the gas passed up a water wash tower and was afterwards joined by a stream of approximately 80 litres per hour of fresh air and was recharged with di-isobutene before being recycled into the reactor.

The combined trap contents and water wash resulting from a 24 hours' run were steam distilled and the organic layer of the distillate fractionated in order to separate the $C_8$ aldehydes, alpha neopentyl acrolein and alpha-methyl beta-tertiary butyl acrolein, and unreacted di-isobutene.

33.8% of the di-isobutene fed into the system was converted into the $C_8$ aldehydes and 43.6% was recovered unchanged.

Instead of copper nitrate equivalent amounts of copper chloride, copper sulphate or copper acetate may be used for the preparation of the copper silicate contact material.

A further modification of the method of preparing a copper silicate of great efficiency for the said oxidation reaction comprises mixing solutions of alkali metal silicate such as commercial sodium silicate, and of a copper salt in amounts wherein the copper exceeds that stoichiometrically required for the replacement of the alkali metal in the alkali metal silicate by divalent copper. The nitrate, sulphate or chloride of copper may be used also for the preparation of the copper silicate according to this modification. It is preferred to use as excess of copper from 20 to 100% of the stoichiometrical proportion. Increasing the amount of the added copper salt beyond 100% does not offer any further special advantage although the catalyst obtained produces good overall yields of the desired unsaturated aldehydes prepared therewith. The copper silicate prepared in this way by the addition of an excess of copper salt results in a copper silicate precipitate which contains more copper than pure copper silicate.

The precipitation is preferably effected by adding a dilute aqueous solution of the copper salt to a cold solution of the alkali metal silicate in water. In this case also it has been found advantageous to use both the solutions of the copper salt and of the alkali metal silicate in not too great a concentration, preferably by using copper salt solutions in concentrations not considerably greater than 25% and solutions of the silicate not considerably greater than 5%, both by weight.

After the precipitation the copper silicate is dried without being subjected to any substantial washing operation. The resulting mass is pelletted, preferably after having been heated in air to about 300–350° C. and the pellets may with advantage be subjected to the heat treatment already described.

Copper silicate when used in conjunction with elementary selenium and especially when prepared in the special ways which form additional features of this invention is particularly effective when used in conjunction with elementary selenium for the oxidation of isobutene to methocrolein and of alpha and beta di-isobutenes to the corresponding unsaturated aldehydes, neopentyl acrolein and alpha-methyl beta-tertiary-butyl acrolein respectively.

Table No. 2 shows comparative results obtained with a copper silicate prepared by precipitation from aqueous solutions of an alkali metal silicate and an equimolecular proportion of the copper salt, and copper silicates prepared by the second modification wherein an excess of copper over that stoichiometrically required for copper silicate was used. The oxidation of isobutene was carried out over these contact materials in conjunction with elementary selenium, under similar conditions of contact time and temperature.

TABLE 2

| Experiment | Copper Silicate Excess of Cu, Percent | Percent Isobutene fed, converted into— | |
|---|---|---|---|
| | | Methacrolein | CO$_2$ |
| 1 | 0 | 13 | 8 |
| 2 | .5 | 9.4 | 2 |
| 3 | 10 | 22 | 8 |
| 4 | 20 | 23 | 3 |
| 5 | 50 | 28 | 3 |
| 6 | 100 | 29 | 3 |

By increasing the contact time between the reactant gas mixture and the solid contact mass, for instance by the use of increased amounts of the copper silicate with all other conditions unchanged a greatly enhanced conversion of the olefine used into the corresponding desired unsaturated aldehyde may be obtained.

The following examples illustrate the process of the invention when carried out with a copper silicate in which the copper is in excess of that stoichiometrically required.

*Example 5*

200 grm. of crystallised copper nitrate was dissolved in one litre of cold distilled water. Commercial sodium metasilicate was titrated against standard acid using methyl orange as indicator, and an amount equivalent to 100 grm.

$$Cu(NO_3)_2 3H_2O$$

i. e. half of that required stoichiometrically (about 100 grm.) was dissolved in 2 litres of distilled water. To this solution the copper nitrate solution was added with vigorous stirring. The precipitate was filtered off under suction. The filtrate was then dried at 80° C. to 100° C. and heated under a stream of air at 300° C. for 1½ hours. The product was then ground and pelletted and the pellets were heated to 600° C. for 1½ hours. 8 grm. of the pellets thus obtained was placed into a reactor as described in Example 1 and heated therein to 320° C. 25 litres per hour of a mixture of 2% of isobutene in air together with 0.02 grm. selenium per hour were passed through the reactor over the catalyst. 29% of the isobutene fed was converted to methacrolein and 3% to carbon dioxide.

*Example 6*

25 litres per hour of a mixture of 2% isobutene in air passed together with 0.02 grm. selenium vapour per hour over 16 grm. of a catalyst prepared as described in Example 5. All the other conditions were maintained as given in that example. The conversion into methacrolein was 57% and into CO$_2$ 12% of the isobutene fed.

*Example 7*

A catalyst was prepared as described in Example 5 except that the excess of copper nitrate used for the precipitation was 20% whilst all the other conditions were maintained the same. 23% of the isobutene fed was converted to methacrolein and 3% to carbon dioxide.

The results in the above two examples may be compared with those obtained with a copper silicate which had been prepared by using equimolecular proportions of copper salt and alkali metal silicate. Before the precipitate was separated from the aqueous medium the latter had a pH of 8.5. When the precipitate was treated in a similar way to that described in Example 6 and isobutene was oxidised over the contact mass under exactly the same conditions as in Example 5, 13% of the isobutene was converted into methacrolein and 8% into carbon dioxide.

*Example 8*

155 grm. of a copper silicate catalyst prepared as described in Example 5 was placed in a ¾" diameter steel reactor which was heated to 320° C. 190 litres per hour of air was charged with the vapours of 14 grm. of di-isobutene which consisted of 75% weight/weight of 2:4:4-trimethyl pent-1-ene and 25% weight/weight of 2:4:4-trimethyl pent-2-ene. The gas mixture was heated to 320° C. and charged with selenium vapour at the rate of 0.214 grm. per hour evaporated from a selenium reservoir. This mixture was then passed through the steel reactor over the catalyst where more than 40% of the di-isobutene was converted to a mixture of alpha-neopentyl acrolein and alpha-methyl beta-tertiary butyl acrolein which was recovered from the gaseous reaction mixture by cooling to a low temperature.

*Example 9*

25 litres per hour of a gas consisting of 2% of mixed n-butenes (butene-1 and butene-2 obtained by catalytic dehydration of secondary butanol), in air, was passed together with 0.02 grm. selenium vapour per hour over 16 grm. copper silicate catalyst prepared as described in Example 5 at 320° C. 10% of the butenes fed was converted into an unsaturated aldehyde.

In the preceding examples the named olefine may with essentially the same success be replaced by any one of the introductorily enumerated olefines while otherwise proceeding as therein described.

We claim:

1. Process for the manufacture of unsaturated aldehydes which comprises reacting an olefine of the general formula

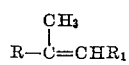

in which R and R1 are selected from the group consisting of hydrogen and saturated alkyl in the vapour phase with molecular oxygen at elevated temperatures in the presence in the reaction zone of elementary selenium and a solid contact material comprising copper silicate.

2. Process as claimed in claim 1, wherein the elementary selenium is introduced into the reaction zone in the form of vapour with the mixture of olefine and molecular oxygen.

3. Process according to claim 1 wherein the reaction temperature is between 200° C. and 400° C.

4. Process according to claim 1 wherein the molecular oxygen is diluted with an inert gas.

5. Process according to claim 1 wherein the amount of olefine in the reactant gas mixture is kept below the explosion limit.

6. Process according to claim 1 wherein the amount of molecular oxygen in the reactant gas mixture is kept below the explosion limit.

7. Process according to claim 1 which comprises carrying out the process in a continuous manner by recycling to the reactor a part of the gas mixture issuing from the reactor after removal of the unsaturated aldehyde produced and replenishing the olefine to be oxidised and the molecular oxygen, whilst a portion of the gaseous mixture is vented.

8. Process according to claim 1 wherein the copper silicate is subjected to a heat treatment before its use as solid contact material.

9. Process according to claim 8 wherein the copper silicate is heated to temperatures between 200 and 1,000° C.

10. Process according to claim 1 wherein the copper silicate is employed in the form of pellets.

11. Process according to claim 1 wherein the copper silicate is precipitated copper silicate which during its preparation after precipitation and before it is dried has been in contact with an acid aqueous medium which has a pH value between 7 and 4.5.

12. Process as claimed in claim 11, which comprises the use of a copper silicate precipitated in an aqueous medium which after the precipitation has a pH value between 7 and 4.5.

13. Process as claimed in claim 11, wherein a copper silicate precipitate is, before it is dried, washed with dilute acid until the wash water running off has a pH between 7 and 4.5.

14. Process as claimed in claim 1 wherein the copper silicate contact material has been prepared by reacting a copper salt with alkali metal silicate in amounts such that the copper salt is in excess over that required stoichiometrically to replace the alkali metal in the alkali metal silicate by bivalent copper.

15. Process according to claim 14 wherein the excess of the copper salt is from 20 to 100 per cent.

16. Process as claimed in claim 11 characterised by the use of a copper silicate which has been prepared by reacting solutions of a copper salt and an alkali metal silicate wherein the solution of the copper salt in water does not considerably exceed 25% and that of the alkali metal silicate 5%.

17. Process according to claim 1 wherein the olefine is isobutene and the aldehyde produced is methacrolein.

18. Process according to claim 1 wherein the olefine is one of the two isomeric di-isobutenes and the reaction product contains a mixture of alpha-neopentylacrolein and alpha-methyl beta-tertiary butyl acrolein.

19. Process according to claim 1, wherein the olefine is commercial di-isobutene.

DAVID JAMES HADLEY.
ROBERT JAMES NICHOL.

References Cited in the file of this patent

UNITED STATES PATENTS

| Number | Name | Date |
|---|---|---|
| 1,955,829 | Pier et al. | Apr. 24, 1934 |
| 2,020,671 | Dreyfus | Nov. 12, 1935 |
| 2,060,086 | Kautter | Nov. 10, 1936 |
| 2,129,732 | Fulton et al. | Sept. 13, 1938 |
| 2,161,066 | La Lande, Jr. | June 6, 1939 |
| 2,270,090 | Thomas | Jan. 13, 1942 |
| 2,280,650 | Kassel | Apr. 21, 1942 |
| 2,366,724 | Gardner | Jan. 9, 1945 |
| 2,383,711 | Clark et al. | Aug. 25, 1945 |
| 2,451,485 | Hearne | Oct. 19, 1948 |
| 2,523,686 | Engel | Sept. 26, 1950 |

FOREIGN PATENTS

| Number | Country | Date |
|---|---|---|
| 625,330 | Great Britain | June 27, 1949 |